United States Patent [19]

Watanabe et al.

[11] Patent Number: 5,132,358

[45] Date of Patent: Jul. 21, 1992

[54] POLYMER EMULSION

[75] Inventors: Naotaka Watanabe, Tokyo; Takeo Arai, Yokohama; Hitoshi Fujiyoshi, Yokohama; Masako Shirota, Yokohama, all of Japan

[73] Assignee: Mitsui-Cyanamid, Ltd., Tokyo, Japan

[21] Appl. No.: 729,772

[22] Filed: Jul. 10, 1991

Related U.S. Application Data

[63] Continuation-in-part of Ser. No. 481,053, Feb. 16, 1990, abandoned.

[30] Foreign Application Priority Data

Feb. 27, 1989 [JP]  Japan .................................. 1-43905

[51] Int. Cl.$^5$ ............................................. C08F 220/60
[52] U.S. Cl. ................................. 524/800; 524/812; 524/813; 524/829
[58] Field of Search ................. 524/800, 812, 813, 829

[56] References Cited

U.S. PATENT DOCUMENTS 3,943,114  3/1976  Hoke .
4,039,501  8/1977  Bablock et al. .................... 524/249

FOREIGN PATENT DOCUMENTS 0031928  7/1981  European Pat. Off. .
63-090537  10/1986  Japan .

Primary Examiner—Joseph L. Schofer
Assistant Examiner—Jeffrey T. Smith
Attorney, Agent, or Firm—Wenderoth, Lind & Ponack

[57] ABSTRACT

A polymer emulsion capable of becoming water swellable is provided by mixing a monomer represented by the general formula

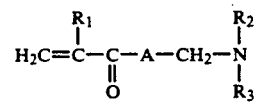

(wherein $R_1$ indicates H or $CH_3$, $R_2$ and $R_3$ indicate an alkyl radical represented by $C_nH_{2N+1}$ in which n is a positive integer, A indicates $-O-CH_2-$ or $-NH-CH_2-CH_2-$, and $R_1$, $R_2$ and $R_3$ are selected within the range wherein the monomer exhibits sparing solubility or insolubility in water)

with a crosslinking agent and optionally with another vinyl monomer capable of copolymerization therewith, and emulsion polymerizing the so-obtained mixture in water. The so obtained a polymer can be made water swellable by reaction with an acid, a salt or a quaternizing agent.

2 Claims, No Drawings

POLYMER EMULSION

This application is a continuation-in-part of now abandoned application Ser. No. 07/481,053 filed on Feb. 16, 1990.

BACKGROUND OF THE INVENTION

1. Field of the Invention

This invention relates to a polymer emulsion capable of becoming water swellable and a water swellable polymer which are usable in the processing of paints, papers, textiles and other products requiring water retentivity and hydrophilic property and also in such fields as adhesives, cement additives, industrial materials, materials for civil engineering and building construction.

2. Description of the Background Art

Owing to their water retentivity, water swellable polymers have high utility in a wide range of industrial fields.

Such water swellable polymers are disclosed, for example, in Japanese Pat. Application Nos. 61(1986)-236249 and 62(1987)-64035.

The water swellable polymer disclosed in the first-mentioned application is of the nonionk/anionic type while that disclosed in the latter is of the cationic type. Both are water-in-oil emulsions.

SUMMARY OF THE INVENTION

One object of the present invention is to provide a unique oil-in-water type polymer emulsion capable of becoming water swellable.

Another object of the present invention is to provide a water swellable polymer.

The polymer emulsion capable of becoming water swellable which is the first object of this invention is provided by mixing a monomer (I) represented by the general formula

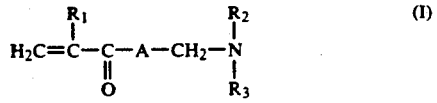

(wherein $R_1$ indicates H or $CH_3$, $R_2$ and $R_3$ indicate an alkyl radical represented by $C_nH_{2n+1}$ in which n is a positive integer, A indicates —O—$CH_2$— or —NH—$CH_2$—$CH_2$—, and $R_1$, $R_2$ and $R_3$ are selected within the range wherein the monomer exhibits sparing solubility or insolubility in water) with a crosslinking agent and optionally with another vinyl monomer (II) capable of copolymerization therewith, and emulsion polymerizing the so-obtained mixture in water to obtain a polymer emulsion capable of being made water swellable by reaction with an acid, a salt or a quaternizing agent.

The water swellable polymer which is the second object of this invention is provided by mixing a monomer (I) represented by the general formula

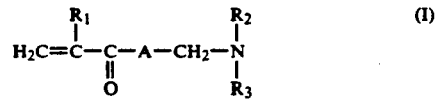

(wherein $R_1$ indicates H or $CH_3$, $R_2$ and $R_3$ indicate an alkyl radical represented by $C_nH_{2n+1}$ in which n is a positive integer, A indicates —O—$CH_2$— or —NH—$CH_2$—$CH_2$—, and $R_1$, $R_2$ and $R_3$ are selected within the range wherein the monomer exhibits sparing solubility or insolubility in water) with a crosslinking agent and optionally with another vinyl monomer (II) capable of copolymerizing therewith, emulsion polymerizing the so-obtained mixture in water in a monomer composition which results in a water insoluble polymer, and reacting the water insoluble polymer with an acid, salt or quaternarizing agent.

DESCRIPTION OF THE PREFERRED EMBODIMENT

The invention will now be explained in detail. As the monomer represented by the general formula (I) and constituting an essential constituent of the present invention there can be mentioned, for example, diethylaminoethyl acrylate, diethylaminoethyl methacrylate, dipropylaminoethyl acrylate, dipropylaminoethyl methacrylate, dibutylaminoethyl methacrylate, diethylaminopropyl methacrylamide, dipropylaminopropyl methacrylamide, dipropylaminopropyl acrylamide, dibutylaminopropyl methacrylamide and dibutylaminopropyl acrylamide.

The crosslinking agent used is one capable of copolymerizing with the monomer (I). As specific examples there can be mentioned N, N'-methylene bisacrylamide, diallylphthalate, divinylbenzene, (poly)ethyleneglycol di(meth)acrylate and the like. Among these N, N'-methylene bisacrylamide is preferable and is added in the amount of 0.005-5 wt%, preferably 0.01-2 wt% with respect to the vinyl monomer (I).

When the crosslinking agent is added at less than 0.005 wt%, it does not produce water swellability after reacting with the acid, salt or quaternizing agent to, and when it is added at more than 5 wt% the water absorbing power of the polymer is degraded.

As the other vinyl monomer (II) copolymerizable with the monomer (I) it is particularly preferable to use a hydrophobic monomer such as acrylic ester, methacrylic ester, acrylonitrile, styrene or the like. The ratio at which the monomer (II) is used is selected within the range in which polymer formed becomes water swellable upon reaction with an acid, salt or quaternizing agent. In the case of a copolymer of diethylaminoethyl methacrylate and methylmethacrylate, the methylmethacrylate can be used in an amount not exceeding 30 wt% of the total amount of monomer.

The total amount of monomer (I) is not less than 70 wt% of the total amount of monomers (I) and (II).

The total amount of monomer (II) is not in excess of 30 wt% of the total amount of monomers (I) and (II).

As a surface active agent for use at the time of emulsion polymerization, there can be used an ordinary one of anion, nonion or cation type, examples being sodium alkylbenzenesulfonate, alkylsulfate, sodium alkylsulfonate, polyoxyethylene alkylethylsulfate, polyoxyethylene alkylphenylethersulfate, polyoxyethylene alkylether, polyoxyethylene alkylphenylether, alkylamine and betaine. Generally, combined use of anion and nonion type surface active agents leads to an emulsion polymer with fewer lumps and higher stability.

As the polymerization catalyst there is used an ordinary radical polymerization initiator such as a peroxide or an azo compound. A water soluble polymerization initiator is particularly preferable.

As the water soluble polimerization initiator there can be used, for example, such peroxides as ammonium persulfate, potassium persulfate, peracetic acid and hydrogen peroxide, and such azo compounds as 2, 2'-azobis-2amidinopropanehydrochloride and 4, 4'-azobis-4cyanopentanoic acid. When a peroxide is used as the initiator, it can, if necessary, be used as a redox system initiator by causing an appropriate reducing agent to be present together therewith.

The water swellability of the obtained polymer can be adjusted as required for the intended use.

The inventors discovered that while the emulsion obtained in the foregoing manner is not water swellable as it is, it can be imparted with water absorbing and swelling property by reaction with an inorganic acid, an organic acid, a salt or a quaternizing agent. This reaction can be conducted, for example, either by adding the emulsion to water to which an acid was added beforehand or by adding an acid to the emulsion after it has been added to water. Preferable acids include hydrochloric acid, sulfuric acid, nitric acid, acetic acid, formic acid, maleic acid, fumaric acid, citric acid, tartaric acid, adipic acid, sulfamic acid and toluenesulfonic acid, while preferable salts include such strong-acid weak-base salts as aluminum sulfate, aluminum chloride, ferric chloride and the like. As the quaternizing agent there can be used such alkyl halides as methyl chloride, ethyl chloride, methyl bromide and methyl iodide, and such ordinary alkyl quaternizing agents as dimethyl sulfate and diethyl sulfate. The acid, salt or quaternizing agent is used in an amount sufficient for imparting water swellability to the polymer and is generally equal to or in excess of the stoichiometric equivalent with respect to the monomer (I).

The step for imparting water swellability can be conducted any time before the polymer is used for some specific purpose. The polymer emulsion exhibits excellent stability and better solubility than a powder product. Thus, in one preferred mode of production the step for imparting water swellability is conducted shortly before use.

It is further possible to apply the polymer emulsion in the manner of a paint and then, after it has dried, to apply the aforesaid acid, salt or quaternizing agent thereon for reaction therewith, whereby the polymer will absorb water and swell, thus exhibiting water retentivity.

The invention will now be explained with reference to specific examples which in no way limit its technical scope. The percentage values mentioned in these examples refer to weight percent unless expressly stated otherwise.

EXAMPLE 1

A four-mouthed 1-1 flask equipped with a stirrer, a cooling pipe, a nitrogen inlet pipe and a thermometer was charged with
Diethylaminoethyl methacrylate: 180 g
N, N'-methylene bisacrylamide: 1.8 g
Deionized water: 420 g
Emal 10 (Kao Sekken K.K.): 1% (based on monomer)
Emalgen 930 (Kao Sekken K.K.): 2% (based on monomer)
whereafter the contents of the flask were deoxygenated with nitrogen gas under stirring and then held at 15° C. Next, the mixture was added with 0.36 g ammonium persulfate and 0.09 g sodium hydrogen sulfite and left to stand for 4 hours at 15° -20° C. for polymerization, whereby there was obtained a milky oil-in-water cationic polymer emulsion (A).

EXAMPLE 2

The procedures Example 1 were followed up to and including the step of deoxygenation. The contents of the flask were then maintained at 50° C., added with 1.08 g 2, 2'-azobis-2-amidinopropanehydrochloride and polymerized for 5 hours at 50°-55° C. to obtain an oil-in-water cationic polymer emulsion (B).

EXAMPLE 3

Two runs were conducted following the procedures of Example 1 except that the monomers used were mixtures of diethylaminoethyl methacrylate and methylmethacrylate (at mixing ratios of 90:10 and 70:30 (%)). There were thus obtained emulsions (C) and (D).

COMPARISON EXAMPLE

An emulsion (E) was obtained by following the procedures of Example 1 except that no N, N'-methylene bisacrylamide was used.

EXAMPLE 4

The emulsions (A) to (D) obtained in Examples 1-3 and the emulsion (E) obtained in Comparison Example were each added with a stoichiometric equivalent of dimethyl sulfate, quaternarized, and cast on a glass frame so as to assume a thickness of 0.5 mm after drying. The resulting films were left standing for one week at room temperature.

Each film was soaked in distilled water for 24 hours for thorough water absorption. It was then removed from the water and weighed, and its water absorption factor was calculated from the difference in weight before and after soaking. The results obtained are shown in Table 1.

TABLE 1

| Emulsion | Absorption factor (times) |
|----------|---------------------------|
| (A)      | 120                       |
| (B)      | 120                       |
| (C)      | 100                       |
| (D)      | 70                        |
| (E)      | Dissolved in the water    |

EXAMPLE 5

The emulsion (A) obtained in Example 1 was cast on a glass frame so as to assume a thickness of 0.5 mm after drying and was left to stand for one week at room temperature After being weighed, the film obtained in this manner was left to soak in 5% sulfuric acid for 24 hours, and weighed again upon removal. The water absorption factor wa determined to be 45.

According to this invention there can be obtained a water swellable polymer exhibiting high water retentivity and having new applications in connection with paints, paper processing agents and the like.

What is claimed is:

1. A polymer emulsion capable of becoming water swellable prepared by mixing a monomer (I) represented by the general formula

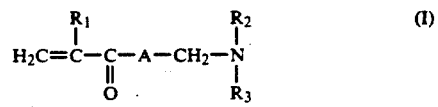

(wherein $R_1$ indicates H or $CH_3$, $R_2$ and $R_3$ indicate an alkyl radical represented by $C_nH_{2n+1}$ in which n is a positive integer, A indicates $-O-CH_2-$ or $-NH-CH_2-CH_2-$, and $R_1$, $R_2$ and $R_3$ are selected within the range wherein the monomer exhibits sparing solubility or insolubility in water), in an amount not less than 70 wt% of the total amount of monomers (I) and (II)

with 0.005 tp 5 wt. % based on the amount of monomer (I) of a crosslinking agent and optionally with another vinyl monomer (II) capable of copolymerization therewith in an amount not exceeding 30 wt. % of the total amount of monomers (I) and (II), and emulsion polymerizing the so-obtained mixture in water in a monomer composition which results in a water insoluble polymer to obtain a polymer emulsion capable of being made water swellable by reaction with an acid, a salt or a quaternizing agent.

2. A water swellable polymer prepared by mixing a monomer (I) represented by the general formula

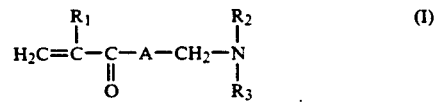

(wherein $R_1$ indicates H or $CH_3$, $R_2$ and $R_3$ indicate an alkyl radical represented by $C_nH_{2n+1}$ in which n is a positive integer, A indicates $-O-CH_2-$ or $-NH-CH_2-CH_2-$, and $R_1$, $R_2$ and $R_3$ are selected within the range wherein the monomer exhibits sparing solubility or insolubility in water), in an amount not less than 70 wt% of the total amount of monomers (I) and (II)

with 0.005-5 wt. % based on the amount of monomer (I) of a crosslinking agent and optionally with another vinyl monomer (II) capable of copolymerizing therewith in an amount not exceeding 30 wt. % of the total amount of monomers (I) and (II), emulsion polymerizing the so-obtained mixture in water in a monomer composition which results in a water insoluble polymer, and reacting the water insoluble polymer with an acid, salt or quaternizing agent.

* * * * *